May 16, 1933. G. W. LANDERS 1,909,285
EYEGLASSES
Filed Sept. 23, 1931

Glenn W. Landers
INVENTOR

BY Victor J. Evans
and Co. ATTORNEY

Patented May 16, 1933

1,909,285

UNITED STATES PATENT OFFICE

GLENN W. LANDERS, OF SHELTON, WASHINGTON

EYEGLASSES

Application filed September 23, 1931. Serial No. 564,637.

My present invention has reference to bifocal glasses and my object is the provision of means whereby a full size lens may be used in spectacles or eyeglasses for distant vision and other lenses that are swingably attached to the frame of the glasses and swingable over the lenses for near work or reading and whereby the glasses may be used for distant vision and the auxiliary glasses may be arranged entirely out of the way.

A further object is to provide a bifocal or distance lens for ordinary glasses or spectacles which may be attached to the eyeglass frame without altering any of the parts thereof and wherein the auxiliary or bifocal glasses are so mounted as to permit of the same being swung in an arc against the lenses of the glasses or along the sides in a line with the temples for the glasses and effectively supported in either of such positions.

To the attainment of the foregoing the invention consists in the improvement hereinafter described and definitely claimed.

Figure 1:
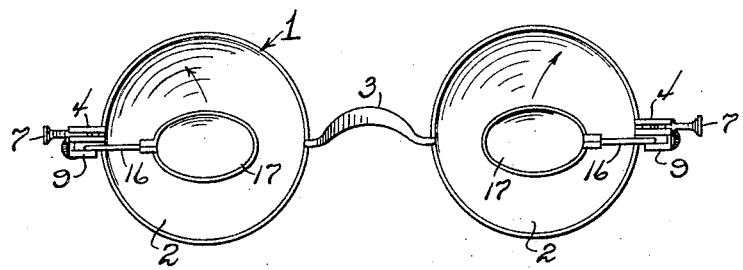
Figure 1 is a view looking toward the inner face of a pair of eyeglases or spectacles equipped with the improvement.
Figure 2:
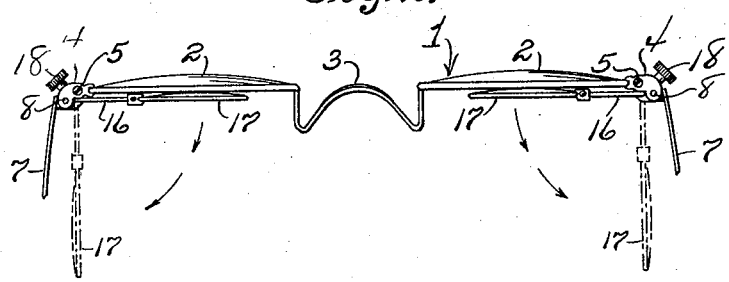
Figure 2 is a top plan view thereof.
Figure 3:
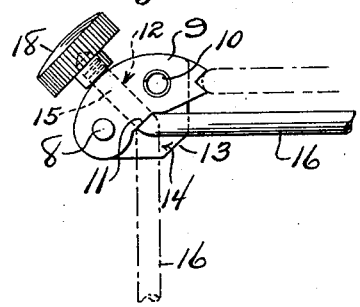
Figure 3 is a plan view of a block that affords the mount for the bifocal lens.
Figure 4:
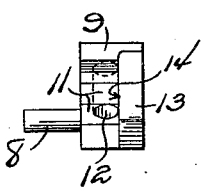
Figure 4 is a side elevation thereof.
Figure 5:
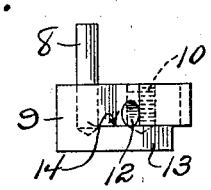
Figure 5 is an end view thereof.

In the drawing the numeral 1 designates an ordinary pair of spectacles or eyeglasses. The spectacles include the usual frame, the lens 2 and the nose bridge 3 that is connected to the frame members. The frame members are of the usual constructions and are centrally divided at their outer sides and provided with the usual angle brackets 4 connected together by the usual binding screw 5 and also provided with outer alining openings for the pivot 8 for the temples 7.

My invention includes a block 9 that has an outstanding pin 8 to be received through the outer alining openings in the brackets and which pins also afford pivots for the temples. The block 9 has its outer edge arched and is provided adjacent one of its ends with a threaded opening 10 in which is threaded the screw 5, the screw 5 in this instance being of a greater length than is ordinary. By this arrangement the block 9 will be held from movement on the under face of the lug 4. The inner face of the block is cut angularly, there being a straight wall 11 between the angle portions, and the block is provided with an angle opening 12 that passes from the said straight wall 11 to the outer rounded edge of the block. Below the opening 12 the inner face of the block is formed with an outstanding portion 13 whose upper wall affords a ledge or shoulder 14.

There is passed through the opening 12 the angle end 15 of a rod 16 which carries the frame or the auxiliary or bifocal lens 17. The angle end 15 of the rod 16 is threaded and is received in the threaded socket of a milled nut 18. The rod, at its juncture with the angle end thereof, will at all times rest on the shoulder 14, and by turning the head or nut 18 the bifocal lens 17 may be brought directly against the inner faces of the lenses 2 and by turning the head 18 in a second direction the bifocal lens 17 will be swung in another arc to arrange the lenses and rod 16 in a line with the temples 7 of the spectacles. By adjusting the nut or head 18 on the rod a frictional engagement will be exerted between the angle and straight ends of the rod with the inner angle face of the block, so that the free turning of the rod will be prevented.

It is thought that the foregoing description when read in connection with the accompanying drawing will fully and clearly set forth the simplicity of my construction and the advantages thereof so that further detailed description will not be required.

Having described the invention, I claim:

1. A bifocal attachment for the frame of a pair of spectacles, including a rod having an angle end, a shouldered element secured to the temple connecting lugs of the frame and through which the angle end of the rod is journaled, a bifocal lens carried by the rod, an operating head on the angle end of the rod in contact with the outer face of the shouldered element and said head being operable to swing the rod through an upward arc to cause the bifocal lens to be arranged directly at the rear but out of contact with the spectacle lens or, when turned in an opposite direction, to swing the rod to bring the same in a plane with the temple of the spectacles when the latter are in open position and said shouldered element affording a rest for the rod when in either of its said positions.

2. A bifocal attachment for a pair of spectacles, comprising a shouldered block secured to the under face of the temple supporting lugs of the frame, said block having a lower shoulder and having inclined walls at the terminal of the shoulder and a straight wall between the inclined walls, a rod carrying a bifocal lens and having an angle threaded end that is journaled through the straight wall of the block, an operating head adjustably screwed on said end of the rod and having a frictional contact with the outer face of the block and said head when turned in one direction designed to swing the lens carrying rod through an upward arc to bring the lens thereon opposite the lens in the spectacles and when turned in a second direction to swing the rod to arrange the same and the lens carried thereby in a plane with the temple of the spectacles when the said temple is open, and the lens carrying rod when in either of its said positions resting on the shoulder of the block.

3. A bifocal attachment for the frame of a pair of spectacles, in which said spectacles have their lens carrying loops slitted and provided with outwardly extending curved lugs or brackets whose confronting faces, at their outer ends are notched and provided with alining openings to afford a bearing for the pintle of the temple and which lugs are connected together by a screw, said bifocal attachment comprising a block to be arranged on the under face of the lugs and having a threaded opening to receive therein the connecting screw for the lugs and likewise having an upstanding pin to pass through the bearing openings for the temple and which pin affords a bearing for the temple, said block having its inner and lower face provided with an outstanding ledge which terminates in upwardly directed angle walls, and a straight wall between the angle walls, which latter has an opening therethrough in a line with the inner face of the ledge, a bifocal lens carrying rod having an angle end which is received through the opening and which rod rests on the ledge, and a milled operating head adjustably secured to the angle end of the rod and in frictional contact with the outer wall of the block.

In testimony whereof I affix my signature.

GLENN W. LANDERS.